(12) United States Patent
Woodruff et al.

(10) Patent No.: US 7,546,260 B2
(45) Date of Patent: Jun. 9, 2009

(54) CONVERTIBLE SECURITY FUNDAMENTAL CHANGE MAKE-WHOLE

(75) Inventors: Kevin G. Woodruff, New York, NY (US); Serkan Savasoglu, New York, NY (US); Nathan McMurtray, New York, NY (US)

(73) Assignee: Morgan Stanley, New York, NY (US)

(*) Notice: Subject to any disclaimer, the term of this patent is extended or adjusted under 35 U.S.C. 154(b) by 950 days.

(21) Appl. No.: 10/857,564

(22) Filed: May 28, 2004

(65) Prior Publication Data

US 2004/0236671 A1    Nov. 25, 2004

(51) Int. Cl.
*G06Q 40/00* (2006.01)
(52) U.S. Cl. .......................... 705/35; 705/37
(58) Field of Classification Search .............. 705/35–45
See application file for complete search history.

(56) References Cited

U.S. PATENT DOCUMENTS

| | | | |
|---|---|---|---|
| 7,257,556 B1* | 8/2007 | Rifkin ...................... | 705/36 R |
| 2001/0056392 A1* | 12/2001 | Daughtery, III .............. | 705/36 |
| 2003/0093375 A1* | 5/2003 | Green et al. .................. | 705/40 |
| 2003/0163400 A1* | 8/2003 | Ross et al. .................... | 705/35 |
| 2004/0006520 A1* | 1/2004 | Birle et al. .................... | 705/35 |
| 2005/0055293 A1* | 3/2005 | Birle et al. .................... | 705/35 |
| 2005/0160025 A1* | 7/2005 | Birle et al. .................... | 705/37 |

OTHER PUBLICATIONS

Liscio, John. (May 1988). The Worst Of Both Worlds? What's Wrong With Convertible Sec. Barron's National Business and Financial Weekly, 68(20), 16. Retrieved Apr. 11, 2009, from ABI/INFORM Global database. (Document ID: 178920).*

Pittel, Leslie. (Jan. 1984). Convertibles Are Back in Style. Forbes, 133(3), 127. Retrieved Apr. 11, 2009, from ABI/INFORM Global database. (Document ID: 1083970).*

Liz Rappaport. (Nov. 18, 2003). Deals & Deal Makers: Convertible-Bond Deals Shelved In Favor of Stock, Straight Debt. Wall Street Journal (Eastern Edition), p. C.5. Retrieved Apr. 11, 2009, from ABI/INFORM Global database. (Document ID: 452345171).*

Providian Prospectus Supplement dated Mar. 15, 2004 to Prospectus dated May 14, 1999.

"United States—Mitigating Acquisition Risk," International Financing Review, Mar. 19, 2004, accessed online Dec. 20, 2008 at http://www.ifre.com/story.asp?sectioncode=&storycode=65152 (2 pages).

"Feature—Arbs Want Make-Whole Protection," International Financing Review, Jun. 5, 2004, accessed online Dec. 20, 2008 at http://www.ifre.com/story.asp?sectioncode=&storycode=63275 (2 pages).

(Continued)

*Primary Examiner*—Hani Kazimi
*Assistant Examiner*—Abhishek Vyas (57) ABSTRACT

A convertible security structured for issuance to at least one investor by an issuer. The convertible security includes a make-whole premium that is payable to the at least one investor upon conversion following occurrence of a fundamental change involving the issuer of at least one underlying security into which the convertible security is convertible, wherein the make-whole premium is determined by using a methodology established at one of prior to issuance and issuance of the convertible security that references a value of an option embedded in the convertible security.

20 Claims, 4 Drawing Sheets

OTHER PUBLICATIONS

"United States—The House Always Wins," International Financing Review, Jun. 12, 2004, accessed online Dec. 20, 2008 at http://www.ifre.com/story.asp?sectioncode=&storycode=63530 (2 pages).

"United States—More Make-Whole," International Financing Review, Jun. 19, 2004, accessed online Dec. 20, 2008 at http://www.ifre.com/story.asp?sectioncode=&storycode=63639 (2 pages).

"M&A Wave Threatening Converts." Investment Dealers' Digest, Jun. 21, 2004, accessed online Dec. 22, 2008 at http://www.accessmylibrary.com/comsite5/bin/aml_landing_tt.pl?page=aml_article_print . . . (2 pages).

"Convertible Instruments in the U.S. Capital Market," Oct. 22, 2008, Presentation by John D. Lobrano of Simpson Thacher & Bartlett LLP (14 pages).

* cited by examiner

Consideration Value

| Effective Date | $12.30 | $13.00 | $14.00 | $15.00 | $16.00 | $17.50 | $20.00 | $22.50 | $25.00 | $27.50 | $30.00 | $35.00 | $40.00 | $50.00 | $100.00 |
|---|---|---|---|---|---|---|---|---|---|---|---|---|---|---|---|
| March 15, 2004 | 0.0 | 2.8 | 6.8 | 11.0 | 15.3 | 21.7 | 24.7 | 22.7 | 21.1 | 19.7 | 18.4 | 16.3 | 14.6 | 12.1 | 0.0 |
| March 15, 2005 | 0.0 | 1.6 | 5.5 | 9.5 | 13.7 | 20.2 | 22.9 | 20.9 | 19.2 | 17.7 | 16.5 | 14.4 | 12.8 | 10.4 | 0.0 |
| March 15, 2006 | 0.0 | 0.7 | 4.4 | 8.3 | 12.5 | 18.7 | 21.3 | 19.1 | 17.3 | 15.9 | 14.5 | 12.5 | 10.9 | 8.7 | 0.0 |
| March 15, 2007 | 0.0 | 0.1 | 3.7 | 7.4 | 11.2 | 17.4 | 19.6 | 17.3 | 15.3 | 13.8 | 12.5 | 10.5 | 9.0 | 7.0 | 0.0 |
| March 15, 2008 | 0.0 | 0.0 | 2.9 | 6.3 | 9.9 | 15.7 | 17.6 | 15.1 | 13.0 | 11.5 | 10.1 | 8.2 | 6.9 | 5.2 | 0.0 |
| March 15, 2009 | 0.0 | 0.0 | 1.9 | 4.9 | 8.2 | 13.6 | 15.0 | 12.1 | 10.0 | 8.4 | 7.2 | 5.5 | 4.4 | 3.3 | 0.0 |
| March 15, 2010 | 0.0 | 0.0 | 0.5 | 2.9 | 5.5 | 10.1 | 10.9 | 7.9 | 5.7 | 4.4 | 3.4 | 2.4 | 1.9 | 1.5 | 0.0 |
| March 15, 2011 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

FIG. 3

Consideration Value

| Effective Date | $12.30 | $13.00 | $14.00 | $15.00 | $16.00 | $17.50 | $20.00 | $22.50 | $25.00 | $27.50 | $30.00 | $35.00 | $40.00 | $50.00 | $100.00 |
|---|---|---|---|---|---|---|---|---|---|---|---|---|---|---|---|
| March 15, 2004 | 0.0 | 2.9 | 7.0 | 11.3 | 15.7 | 22.6 | 22.2 | 20.5 | 19.0 | 17.8 | 16.7 | 15.1 | 13.8 | 11.9 | 0.0 |
| March 15, 2005 | 0.0 | 1.3 | 5.4 | 9.6 | 13.9 | 20.7 | 20.2 | 18.4 | 16.9 | 15.7 | 14.7 | 13.2 | 12.0 | 10.2 | 0.0 |
| March 15, 2006 | 0.0 | 0.2 | 4.0 | 8.2 | 12.4 | 19.0 | 18.3 | 16.5 | 14.9 | 13.8 | 12.7 | 11.2 | 10.1 | 8.6 | 0.0 |
| March 15, 2007 | 0.0 | 0.0 | 3.1 | 6.9 | 10.9 | 17.3 | 16.5 | 14.4 | 12.9 | 11.6 | 10.7 | 9.3 | 8.3 | 7.1 | 0.0 |
| March 15, 2008 | 0.0 | 0.0 | 2.0 | 5.6 | 9.4 | 15.5 | 14.3 | 12.1 | 10.5 | 9.3 | 8.3 | 7.1 | 6.3 | 5.4 | 0.0 |
| March 15, 2009 | 0.0 | 0.0 | 1.0 | 4.1 | 7.5 | 13.2 | 11.6 | 9.3 | 7.6 | 6.5 | 5.7 | 4.7 | 4.2 | 3.7 | 0.0 |
| March 15, 2010 | 0.0 | 0.0 | 0.0 | 2.2 | 5.0 | 10.0 | 7.8 | 5.4 | 4.0 | 3.1 | 2.7 | 2.2 | 2.1 | 1.9 | 0.0 |
| March 15, 2011 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

CONVERTIBLE SECURITY FUNDAMENTAL CHANGE MAKE-WHOLE

BACKGROUND

Many firms, companies, corporations, and other entities issue securities such as straight debt or common stock in order to raise capital for their business endeavors. A straight debt security (e.g., a bond, a note, a loan, or a mortgage) raises capital by arranging for an entity to repay a principal amount of borrowed debt, and interest on that debt, throughout the life of the security. A common stock security raises capital by selling an equity interest in the entity. Entities may also sell convertible securities, which provide their holders with the option to exchange the convertible securities for other securities (e.g., common stock) at a predetermined conversion price.

Convertible securities are attractive to investors due to their capacity for earning interest like a bond when the common stock price is below the conversion price, while realizing value like common stock when the stock price rises. This occurs because typically the holder of a convertible security has the option (but not the obligation) to exercise the conversion feature at a time of the holder's choosing. The value of this option is derived from its terms and from the characteristics of the underlying security into which the convertible security is convertible. Often the option's value is sufficient incentive for an investor to accept a lower interest rate on the convertible security than might normally be acceptable to the investor for non-convertible securities. However, because the option derives much of its value from the value of the underlying security, adverse changes in the characteristics of the underlying security can significantly reduce the option's value. The possibility of such changes reduces the value investors initially ascribe to the option and therefore reduces the interest rate savings for the issuing entity compared to issuing straight debt.

For convertible securities, where the underlying security is generally common stock of the issuing entity, events and situations that adversely change the characteristics of the underlying security often revolve around changes of control of the issuing entity. These can include, for example, acquisitions, mergers, takeovers, exchange offers, liquidations, combinations, reclassifications, recapitalizations, consolidations or similar transactions (the foregoing being examples of "fundamental changes"). Historically, convertible securities address these events by providing that the investor's option to convert into the underlying security is automatically changed to an option to convert into whatever the investor would have received as a holder of the underlying security if the investor had exercised the conversion option immediately prior to the event. For instance, if in the course of a merger the common stock of the target was purchased by the acquirer for $100 per share, a convertible security issued by the target that was convertible into 10 shares of the target's common stock would become convertible instead into $1,000 ($100 multiplied by 10 shares). If the acquirer had instead paid 5 shares of its common stock per share of the target's stock, the convertible security would become convertible into 50 shares of the acquirer's stock (5 acquirer shares multiplied by 10 target shares). The new assets/consideration into which the original underlying security may be converted, will for convenience continue to be referred to herein as the underlying security (regardless of whether the assets/consideration are in the form of securities, cash or other property).

This treatment of changes in the underlying security is relatively simple to apply and matches the historical treatment of listed options in these circumstances. However, it does not account for the decrease in value of the option in situations where the volatility of the underlying security decreases. Volatility of the underlying security is one of the key inputs in valuing options, with higher volatilities generally increasing option value and lower volatilities decreasing it. Since the value of cash in practical terms does not change, cash has no volatility, which makes acquisitions paid for with cash (or similar events) of particular concern to convertible securities investors. These events may result in the transformation of the underlying security from common stock (which has some volatility) into cash (which has no volatility), and therefore reduce both the value of the option embedded in the convertible security and, by extension, the value of the convertible security. However, even if the new underlying security is also common stock (as in a stock for stock acquisition), a decrease in value will still occur if the volatility of the new common stock is less than that of the original common stock.

Convertible securities typically only provide limited protection against this decrease in value. The vast majority of convertible securities do so by requiring the issuer of the convertible securities to offer to repurchase the convertible securities from investors (an "investor put") upon the occurrence of an event that changes the underlying security. The price that the convertible security is repurchased at typically equals its principal amount plus any accrued and unpaid interest. Investors thus typically may choose between putting the convertible securities for the principal amount, converting the convertible securities for parity (the value of the underlying securities into which the convertible securities is convertible) or continuing to hold the convertible securities. These choices all involve potential loss of value, particularly if the price of the convertible securities exceeds their principal amount. In this case, the value of the convertible securities prior to the effective date of the fundamental change exceeds both principal amount and parity, yet will decrease after the fundamental change if the volatility of the underlying securities decreases. Investors are thus protected only in situations where the value of the convertible securities does not exceed the greater of parity or the principal amount (typically when the price of the underlying securities remains below the conversion price).

Historically, investors have been willing to accept this limited protection against fundamental changes because the probability of specific issuers undergoing a fundamental change was viewed as difficult to determine exactly but generally low. When this has not been the case, such as with prospective issuers that have disclosed their discussions with potential acquirers or prospective issuers whom investors believe are likely acquisition targets, convertible securities investors have been less willing to purchase convertible securities issued by these entities or have demanded more favorable terms. In particular, investors may assess the value of the option embedded in the convertible security using a lower volatility assumption than they would otherwise to reflect the possibility that they will be unable to receive full value for the option upon a fundamental change. Since this affects the terms available to the issuing entities, it may decrease the attractiveness of issuing convertible securities and restrict these entities' flexibility in raising capital.

Prospective convertible security investors and underwriters of convertible securities are also disadvantaged if entities that otherwise might issue convertible securities do not choose to because of an inability to obtain attractive terms.

This is especially the case to the extent that potential issuers are difficult to find.

A very few convertible securities have attempted to address this problem by increasing the repurchase price payable upon a fundamental change by an arbitrary amount which may be fixed or decline over time (e.g, 10% at issuance, declining by 0.50% semiannually until 100% is reached). However the market has not adopted this practice for a number of reasons, including that increasing the compensation arbitrarily does not satisfy investor concerns unless the amount is large enough to cover all contingencies that investors deem reasonably likely. Doing so may overcompensate investors in many scenarios and increases the potential price to the issuer, decreasing the willingness of the issuer to issue convertible securities. Moreover, the presence of an overly large compensating payment also may impair the willingness of potential acquirers to consummate a transaction with the issuer, which may further decrease the willingness of the issuer to issue convertible securities.

This problem has also been faced by the over-the-counter equity derivatives market, which has developed a practice of compensating option counterparties for the loss in value by terminating the option with a make-whole payment that preserves for the option counterparty the economic value of the transaction from the date of the fundamental change through its remaining life if the fundamental change had not occurred. The amount of the payment is determined based on quotations from market dealers using specified assumptions including historical volatility (typically over a two-year or 90 day period) and the price paid for the underlying securities in the fundamental change.

This approach works in the over-the-counter equity derivatives market but not in the convertible securities market largely due to fundamental differences in the nature of the two markets. Over-the-counter equity derivatives are typically sold in a privately negotiated transaction to a single counterparty that often is responsible for making all calculations under the contract and negotiates directly with the issuer. By contrast, convertible securities are virtually always sold to numerous investors in an offering through one or more underwriters or placement agents, with either the issuer or a trustee responsible for calculations. Because investors in convertible securities negotiate only indirectly with the issuer, they express their views mostly in terms of price (often as a yield and/or premium demanded for a specified price) assuming substantive provisions specifically described in the offering materials for the convertible securities (rather than negotiating the substantive provisions of the convertible securities directly). This process is further complicated by lack of standardization in the pricing models for convertible securities compared to the models used to price over-the-counter equity derivatives. As a result, convertible securities investors tend to strongly prefer certainty when the convertible securities are issued and reflect this preference in their pricing of a potential issuance.

In view of the foregoing, it may be desirable to develop a convertible security that adequately compensates convertible securities investors for the value of the option embedded in the convertible security if the issuer of the security underlying the convertible security undergoes a fundamental change.

SUMMARY

In various embodiments of the present invention, convertible securities instruments and methods of offering and structuring such instruments are provided. Various embodiments include a convertible security structured for issuance to at least one investor by an issuer. The convertible security includes a make-whole premium that is payable to the at least one investor upon conversion following occurrence of a fundamental change involving the issuer of at least one underlying security into which the convertible security is convertible, wherein the make-whole premium is determined by using a methodology established at one of prior to issuance and issuance of the convertible security that references a value of an option embedded in the convertible security.

In various embodiments, a method of determining a make-whole premium with reference to the value of an option embedded in a convertible security is provided. The method includes applying a convertible bond pricing model to calculate a theoretical value of the convertible security at a specified date and subtracting a greater of a principal amount of the convertible security and a value of an underlying security into which the convertible security is convertible from the theoretical value to determine the make-whole premium.

Various embodiments of the present invention also provide a method that includes determining a make-whole premium when a fundamental change involving an issuer of a security underlying a convertible security occurs, wherein the make-whole premium is determined by using a methodology established at one of prior to issuance and issuance of the convertible security that references a value of an option embedded in the convertible security. The method also includes one of converting and putting the convertible security into at least one of cash, an asset, a property, and a security and adding the make-whole premium to a value of the at least one of cash, the asset, the property, and the security.

In various embodiments, a system is provided. The system includes a first data processing device associated with an investor and a second data processing device associated with an investment bank. The system also includes a third data processing device associated with an issuer of a convertible security, wherein the third data processing device is configured to enable the issuer to calculate a make-whole premium that is payable to at least one investor upon conversion following occurrence of a fundamental change involving the issuer, wherein the make-whole premium is determined by using a methodology established at one of prior to issuance and issuance of the convertible security that references a value of an option embedded in the convertible security.

Other embodiments of the present invention will become apparent to those skilled in the art upon review of the following description and figures. It is intended that all such additional embodiments are within the scope of the present invention and are protected by the claims.

BRIEF DESCRIPTION OF THE FIGURES

FIGS. 3 and 4 illustrate various exemplary aspects of additional premiums that may be added to a fixed percentage to comprise a make-whole premium according to various embodiments of the present invention.

DESCRIPTION

As employed herein, an "investor" includes any financial entity, institutional entity, corporate entity, government entity, individual entity, etc. capable of managing, transacting, maintaining, performing, etc. one or more financial or investment functions in accordance with various embodiments of the present invention. It can be appreciated that the term "investor" includes entities such as, for example and without limitation, hedge funds, mutual funds, family offices, separately managed accounts, limited partnerships, trusts, and/or other entities, institutions and/or accounts which can be structured to invest in accordance with various aspects of the present invention.

As employed herein, an "issuer" includes any financial entity, institutional entity, corporate entity, government entity, financial institution, business, company, firm, and/or other entity capable of performing one or more financial functions, investment functions, and/or other functions in association with practice of various aspects of the present invention. A suitable "issuer" may, for example, issue a convertible security to an investor.

As employed herein, a "fundamental change" includes acquisitions, mergers, takeovers, exchange offers, liquidations, combinations, reclassifications, recapitalizations, consolidations, etc., or any transaction whereby the securities underlying convertible securities are exchanged for some other consideration. The term "fundamental change" also includes transactions commonly referred to as "changes of control" occurring upon events such as changes in the ownership of the issuer's voting securities, changes in composition of the issuer's board of directors, acquisition of more than specified percentages of securities of the issuer, etc. A non-limiting example of a fundamental change is any transaction, series of related transactions or event (whether by means of an exchange offer, liquidation, tender offer, consolidation, merger, combination, reclassification, recapitalization or otherwise) in connection with which: (A) more than 50% of the common stock of the issuer or other capital stock or equity or voting interests is exchanged for, converted into, acquired for or constitutes the right to receive cash, securities or other property, or the common stock of the issuer ceases to be listed on a national securities exchange or quoted on the Nasdaq National Market; or (B) the issuer sells or otherwise disposes of all or substantially all of its and its subsidiaries' assets, properties or businesses, taken as a whole.

As employed herein, a "conversion" means the exercise by an investor in convertible securities of the option to acquire the underlying securities which may be securities issued by the convertible security issuer or securities issued by another entity. Accordingly, the terms "conversion" or "convert" as used herein include "exchange." Similarly, the term "convertible security" includes "exchangeable security."

In various embodiments of the present invention, a convertible security issued by an issuer and sold to one or more investors is structured such that a make-whole premium is payable to investors if a fundamental change occurs and investors exercise their right to convert the convertible securities into the underlying securities. In various embodiments, the convertible security may further provide that the issuer also pays the investors that convert the convertible security, in the event of a fundamental change, accrued but unpaid interest (if any) to the date of conversion. Investors that convert in response to the fundamental change would thus receive the underlying securities, the make-whole premium (payable in, for example, cash, the underlying security, a security fungible to the underlying security, or the same form of consideration into which the underlying security has been converted in connection with the fundamental change) and possibly accrued but unpaid interest. In various embodiments, the convertible security is also structured to include a put right for investors upon a fundamental change, wherein the issuer is required to offer to repurchase the convertible security from investors at a price equal to the principal amount, plus a make-whole premium and accrued and unpaid interest (if any) to the date of repurchase.

Figure 1:
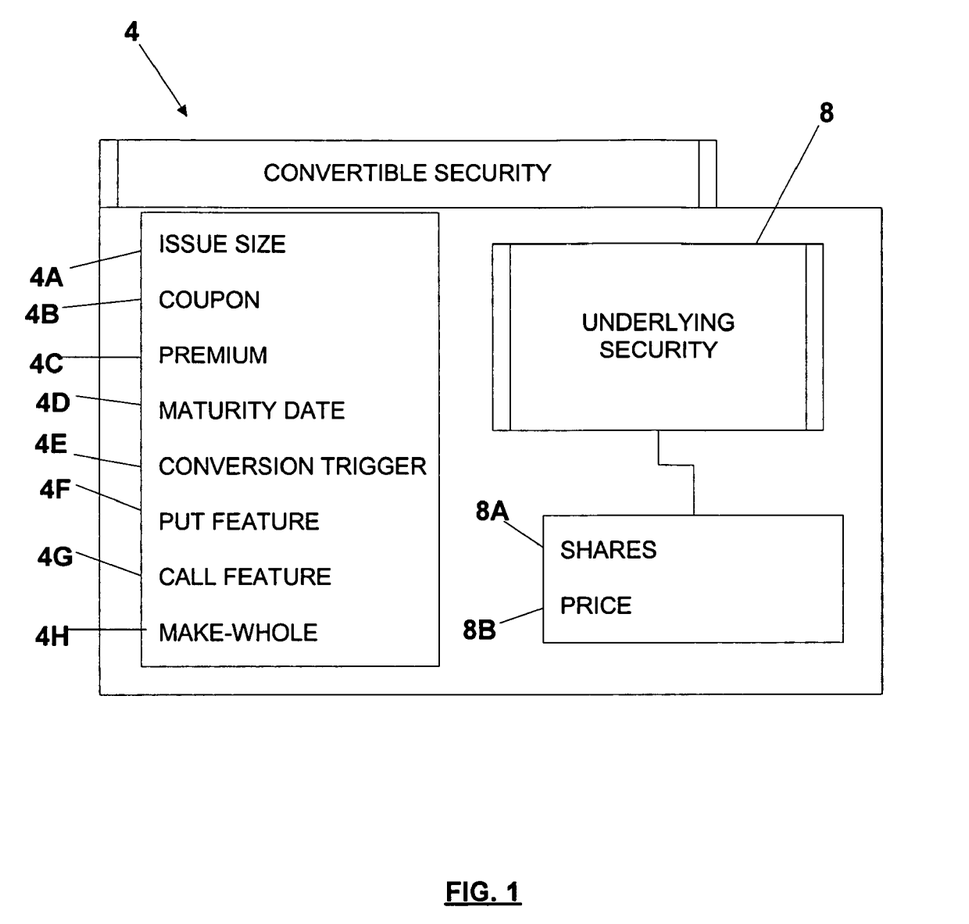
FIG. 1 illustrates various features of a convertible security according to various embodiments of the present invention.

FIG. 1 illustrates various features of a convertible security 4 according to various embodiments of the present invention. The convertible security 4 may possess a number of features such as, for example and without limitation, an issue size 4A, a coupon 4B, a premium 4C, a maturity date 4D, a conversion trigger 4E, a put feature 4F, a call feature 4G, and/or a make-whole premium 4H. In various aspects, the convertible security 4 may include a note, a bond, or other debt instrument or preferred stock. In addition, the convertible security 4 is associated with a security into which the security 4 is convertible, i.e., underlying security 8. The underlying security 8 may include a number of shares 8A having a price 8B that may vary according to prevailing market conditions. In certain aspects, the underlying security 8 may be common stock of the issuer, for example, or common stock of another entity.

The conversion trigger 4E is the price paid for shares 8A of the underlying security 8 upon conversion of the convertible security 4 by an investor, and is typically at a premium to the market value of the underlying shares 8A as determined prior to issuance of the convertible security 4 to the investor. In certain aspects, the put feature 4F of the convertible security 4 may include, for example, a puttable-at-par feature or a puttable-at-accreted-value feature (e.g., for zero-coupon bonds) that becomes effective at a period or periods of time after the sale of the security 4. In other aspects, the call feature 4G of the convertible security component 4 may include, for example, a callable-at-par feature or a callable-at-accreted-value feature (e.g., for zero-coupon bonds) that becomes effective at a period or periods of time after the sale of the security 4. In certain aspects, the call feature 4G may be at a premium to par value or accreted value. According to various aspects, the security 4 may include a contingent conversion feature and/or a contingent interest feature.

In various embodiments and as described hereinbelow, the amount of the make-whole premium 4H may be determined pursuant to a formula or by interpolation between points on one or more tables, or any other method designed to accurately assess the loss of value to investors in the convertible security 4 in accordance with aspects of the present invention. For example, in one embodiment, at the time of issuance of the convertible security 4, the underwriter and prospective issuer may establish a table or matrix of make-whole premiums 4H. The table may be computer generated and may store a make-whole premium 4H for each combination of two parameters: dates upon which a fundamental change is effective and values of consideration paid in connection with the fundamental change. Examples of such a table are shown in FIGS. 3 and 4. In the illustrated tables, the make-whole premiums 4H are expressed as a percentage of the principal amount of the convertible security 4, though other expressions are possible. The range of the effective dates parameter may be, for example, between the convertible issuance date (or perhaps a later date) and the maturity date or first put date (or perhaps an earlier date). The table may specify effective dates within the range at any intervals (e.g., yearly, monthly, daily, etc.). The range and intervals specified for the consideration values may be set as appropriate.

In one embodiment, the make-whole premiums 4H shown, for example, in the tables of FIGS. 3 and 4, are determined as follows: (1) using a convertible bond pricing model (e.g., the models provided by Bloomberg, Monis, Kynex, or TrueCalc) using as inputs factors based on the terms and conditions of the convertible security 4 (e.g., the price of the underlying securities 8 on the date the convertible security 4 was priced, the interest rate (i.e., coupon rate), a volatility assumption with regard to the underlying security 8, a credit spread, a forward interest rate curve, the conversion rate, call protection, put (if any), maturity, etc.) and using various scenarios of consideration values and dates on which the fundamental change becomes effective (i.e., the combinations of parameters used to index the tables of FIGS. 3 and 4) to determine a series of theoretical convertible security prices; and (2) subtract from each theoretical price determined by the convertible bond pricing model, the greater of: (a) the principal amount of the convertible security 4; and (b) parity. The make-whole premiums 4H may then be expressed as a percentage of principal and stored in the table under the appropriate effective date/consideration value combination. The make-whole premiums 4H determined in this manner take into account the value of the option embedded in the convertible security 4 at the time of the fundamental change based on the terms and conditions when the convertible security 4 was issued and the value that investors can realize from the convertible security 4 at the time of the fundamental change (whether by put or conversion).

In various embodiments, the make-whole premiums 4H calculated above may be enhanced by adding an additional amount (e.g., 1% of the principal amount), for example, to account for differences in valuation models used by investors to value the embedded option contained within the convertible security 4. Of course, if desired, the make-whole amounts stored, for example in a make-whole amount table, may already be enhanced to include such additional amounts.

In various embodiments and as described hereinbelow, the underlying security price applied at the time of a fundamental change may be determined based upon the form of consideration offered in the event constituting a fundamental change (the "acquisition currency"). If the acquisition currency is solely cash, the underlying security price may be deemed to be the amount of cash paid per underlying security. If the acquisition currency is not solely cash, the underlying security price may be deemed to be an average of the prices of the underlying securities over a specified period (e.g., 10 trading days prior to the effective date of the fundamental change).

In various embodiments, to achieve desirable accounting treatment, the make-whole premium 4H may be payable solely in shares 8A of the original underlying security 8 or in the same form of consideration into which all or substantially all of the shares 8A of the underlying security 8 have been converted in connection with the fundamental change. For example, where the shares 8A of the underlying security 8 are common stock of the issuer, this permits the option embedded in the convertible security 4 to meet criteria set out in various accounting rules for the issuer to avoid accounting for changes in the valuation of the option separately from the convertible security 4. This arrangement may be of benefit to issuers because it reduces administrative and accounting burdens as well as income statement volatility. In various embodiments that do not seek such accounting treatment, the make-whole premium 4H may be payable in cash or any other form of consideration. Various embodiments may address concern about liquidity of the consideration in which the make-whole premium 4H is paid by providing that cash consideration receives full value, while securities, non-cash assets or non-cash property are valued at a discount (e.g., 5%) to market value or fair value, as appropriate.

By providing for payment of the make-whole premium 4H both upon conversion or put of the convertible security 4, investors may be better protected against declines in value of the convertible security 4 as a result of a fundamental change. Investors are assured of receiving compensation for the value of the embedded option in excess of the greater of the principal amount or parity. This arrangement is a substantial improvement over the prior art, which exposes investors to risk in cases where the value of the embedded option exceeds the principal amount or parity (often because the price of the underlying securities increased prior to the effective date of the fundamental change). As a result, investors are more willing to fully value the option embedded in the convertible security 4, which allows issuers to achieve better terms. Moreover, the willingness of issuers to issue convertible securities 4 is enhanced because the compensation to investors is related to the value of the option rather than an arbitrary amount.

Figure 2:
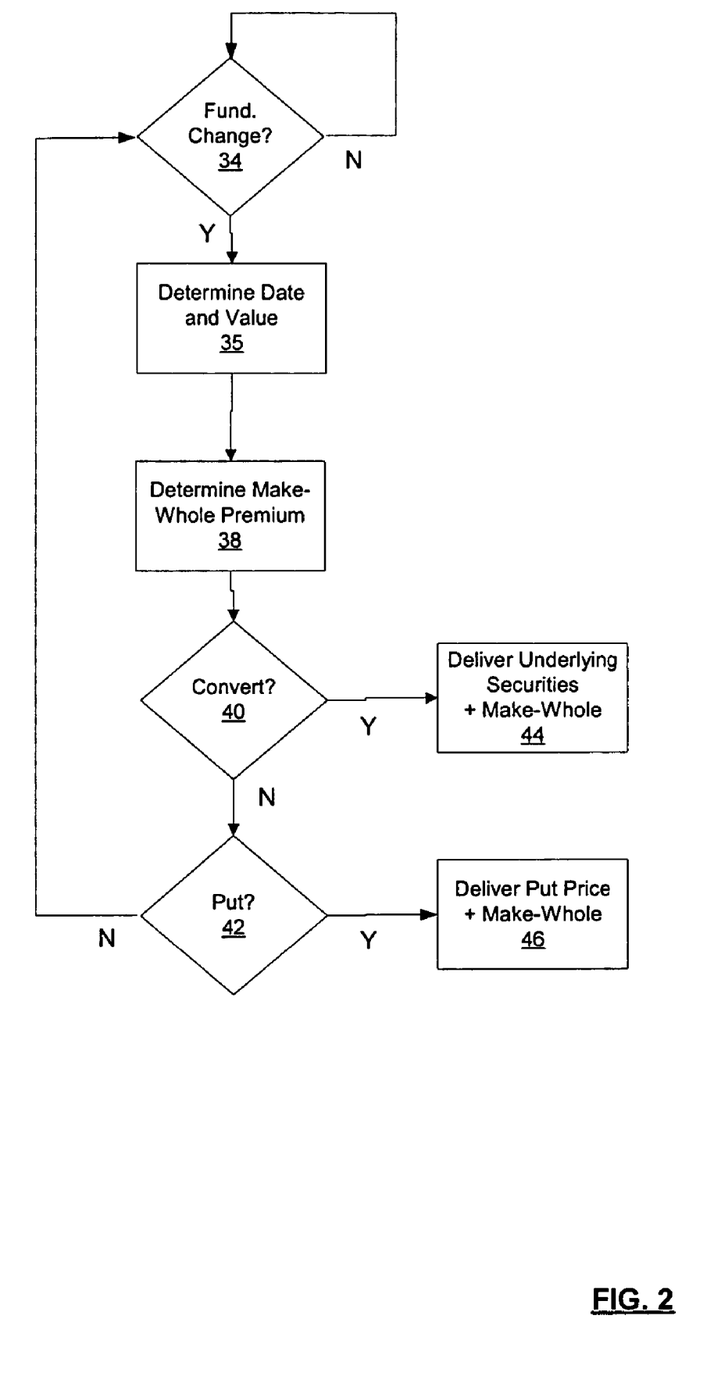
FIG. 2 illustrates a process that occurs upon a fundamental change involving the issuer of securities underlying a convertible security with a make-whole premium according to various embodiments of the present invention.

FIG. 2 illustrates a process that occurs upon a fundamental change involving the issuer of securities underlying a convertible security 4 with a make-whole premium 4H according to various embodiments of the present invention. At step 34, it is determined if the issuer of the underlying securities has undergone a fundamental change. If so, the effective date of the fundamental change and a value of the shares 8A of the underlying security 8 are determined at step 35. A make-whole premium 4H is determined at step 38 and it is determined whether the security 4 will be converted or put at steps 40 and 42, respectively. The make-whole premium 4H may be determined as discussed hereinbelow. An investor that converts or puts on a fundamental change at steps 44 or 46, respectively, may thus receive, in various embodiments, the make-whole premium 4H, the amount of the underlying security 8 into which the convertible security 4 is convertible (or an equivalent value of cash, securities, or other assets or property) in the case of conversion, or the put price in the case of a put, and in either case accrued but unpaid interest. The per-share value of the consideration paid in the fundamental change is determined at step 35 so that the amount of the make-whole premium 4H can be calculated at step 38.

If at step 35 it was determined that the consideration was paid in securities that are traded on a national securities exchange or approved for quotation on the Nasdaq National Market, the consideration may be valued by computing a specified percentage of the average of the closing price or last sale price of the securities for a specified number of trading days prior to a specified date. If at step 35 it was determined that the consideration was paid in assets or property (other than cash) or securities other than securities that are traded on a national securities exchange or approved for quotation on the Nasdaq National Market, then, the consideration may be valued by computing a specified percentage of the fair market value of such assets, property or securities as determined by the board of directors or an independent party or parties selected by a trustee. A specified percentage in either case is used to account for illiquidity or imprecision in valuation of the securities. If the consideration was paid in cash, then the consideration maybe valued at 100%. or a different specified percentage (e.g., perhaps taking into account currency valuations or other factors).

At step 38, the make-whole premium 4H is calculated or determined based on the above determination of the effective date and the consideration value. For example, a previously established table (such as shown in FIGS. 3 and 4) may be indexed using the determined effective date and consideration value. In other embodiments, the make-whole premium may be determined by a calculation without the use of a look-up table.

As mentioned previously, the make-whole premium 4H determined at step 38 may be enhanced by adding to it, for example, a fixed or variable amount. In one embodiment, the amount is a fixed percentage, e.g., 1% of the principal amount. As also mentioned previously, this additional amount may already be factored into the premium amounts stored in, for example, a look-up table.

In one embodiment, the make-whole premium 4H is not paid if the share value, as determined at step 35, is below a first specified dollar amount or above a second specified dollar amount. The first specified dollar amount may be the closing share price of shares 8A of the underlying security 8 on the date of pricing of the convertible security 4 or a specified share price. The second specified price may be, for example, a value at which the change in option value with change in underlying security price is not significant.

The table illustrated in FIG. 3 shows what the premiums would be assuming an initial coupon rate of 2¼%, a conversion rate that results in a conversion price at 50% higher than the price of the shares 8A of the underlying security 8 at pricing and a consideration value of $12.30. The values shown in the tables of FIGS. 3 and 4 are percentages of principal amount.

The table illustrated in FIG. 4 shows what the premiums would be assuming an initial coupon rate of 2¾%, a conversion rate that results in a conversion price at 45% higher than the price of the shares 8A of the underlying security 8 at pricing and a consideration value of $12.30.

In various embodiments, if the exact consideration value and effective fundamental change date are not set forth in the look-up table (such as a table illustrated in FIG. 3 or 4), then if the consideration value is not above a threshold or below a threshold (e.g., the aforementioned first and second specified dollar amounts) and is between two consideration values on the table or the effective date is between two dates on the table, the premium may be determined by straight-line interpolation between premium amounts set forth for the higher and lower consideration values and the two dates, as applicable.

In various embodiments, the consideration values set forth in the tables shown in FIGS. 3 and 4 may be adjusted as of any date on which the conversion rate of the security 4 is adjusted (e.g., dilutive events such as stock splits, dividends, etc.). For example and by way of illustration, the consideration value may be adjusted to equal the consideration value applicable immediately prior to the conversion rate adjustment multiplied by a fraction, the numerator of which is the conversion rate immediately prior to the adjustment and the denominator of which is the adjusted conversion rate.

Figure 5:
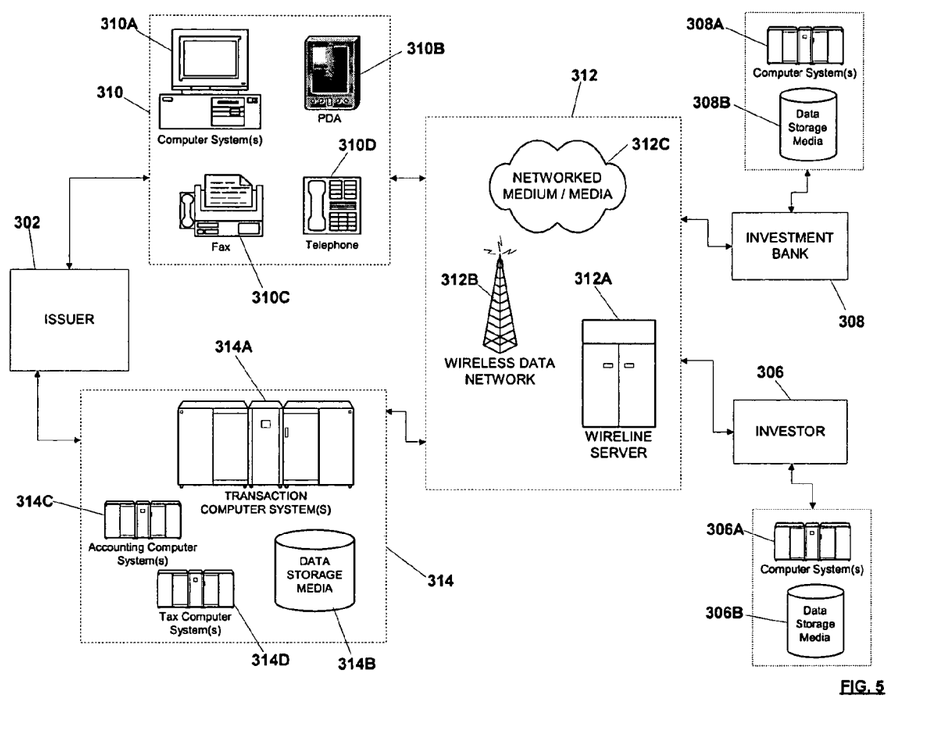
FIG. 5 illustrates a schematic diagram of examples of system and computer-readable medium embodiments provided in accordance with the present invention.

FIG. 5 illustrates a schematic diagram of examples of system and computer-readable medium embodiments provided in accordance with the present invention. As shown, an issuer 302 may communicate and/or exchange data with an investor 306 and/or an investment bank 308. In various aspects, the issuer 302 may be operatively associated with one or more communications devices 310 such as, for example and without limitation, a computer system 310A, a personal digital assistant 310B, a fax machine 310C, and/or a telephone 310D (e.g., a wireline telephone, a wireless telephone, a pager, and the like), and/or other like communication devices. The communication devices 310 permit the issuer 302, the investor 306, and/or the investment bank 308 to communicate between/among each other through one or more communication media 312, such as by employing electronic mail communicated through one or more computer systems, for example. The communication media 312 may include, for example and without limitation, wireline communication means such as a wireline server 312A, a wireless data network 312B, and/or a connection through a networked medium or media 312C (e.g., the Internet, an extranet, an intranet, a wide area network (WAN), and/or a local area network (LAN)).

In addition, the issuer 302 (as well as any one or more of the investor 306 and/or the investment bank 308) may be operatively associated with one or more data processing/storage devices such as data processing/storage devices 314, for example. The issuer 302 may be operatively associated with one or more transaction computer systems 314A, for example, and/or one or more data storage media 314B configured to receive, store, analyze and/or otherwise process data and other information in association with communications that occur between/among the issuer 302, the investor 306, and/or the investment bank 308. In various aspects, the issuer 302 may be operatively associated, for example, with one or more accounting computer systems 314C and/or one or more tax computer systems 314D. The accounting/tax computer systems 314C, 314D may be configured for receiving, storing, and/or processing accounting/tax data, among other types of data, associated with one or more aspects of a convertible security transaction, for example, of the present invention.

In various aspects, the investor 306 may be operatively associated with one or more computer systems 306A and/or one or more data storage media 306B. In still other aspects, the investment bank 308 may be operatively associated with one or more computer systems 308A and/or one or more data storage media 308B. It can be appreciated that one or more of the computer systems 306A, 308A, 314A, 314C, 314D and/or one or more of the data storage media 306B, 308B, 314B may be employed to communicate, store, analyze, and/or otherwise process data related to financial transactions occurring between/among the issuer 302, the investor 306, and/or the investment bank 308.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be, for example and without limitation, either alone or in combination, a personal computer (PC), server-based computer, server, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein.

It can be appreciated that, in various embodiments disclosed herein, a single component/element/entity can be replaced by multiple components/elements/entities and multiple components/elements/entities can be replaced by a single component/element/entity, to perform a given function or functions. Except where such substitution would not be operative to practice aspects of the present embodiments, such substitution is considered to be within the scope of the present invention.

Examples presented herein, including operational examples, are intended to illustrate potential implementations of the present invention. It can be appreciated that such examples are intended primarily for purposes of illustration. No particular aspect or aspects of the example embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the claims.

What is claimed is:

1. A computer-implemented method for supporting the issuance of convertible securities that are convertible into a quantity of an underlying security upon conversion by a holder of the convertible securities, the method comprising:

calculating, by an electronic computer comprising a processor and a memory device, prior to issuance of the convertible securities, entries for a table data structure that establish an amount for a make-whole premium to be paid to the holders of the convertible securities in the event of a fundamental change involving the underlying security, wherein the make-whole premium is compensation that is payable to the holders of the convertible securities upon conversion of the convertible securities following occurrence of the fundamental change, wherein the make-whole premium is determinable from the table based on an effective date of the fundamental change and a consideration value involved in the fundamental change;

wherein the fundamental change comprises one of (i) an acquisition, (ii) a merger, (iii) a takeover, (iv) an exchange offer, (v) a liquidation, (vi) a combination, (vii) a reclassification, (viii) a recapitalization, (ix) a consolidation, (x) a transaction in which a common stock of an issuer of the convertible security is exchanged for some consideration, (xi) a change of control occurring upon (a) a change in an ownership of the issuer's voting securities, (b) a change in a composition of the issuer's board of directors, or (c) an acquisition of more than a specified percentage of securities of the issuer, or (xii) sale or other disposition of all or substantially all of the issuer's and its subsidiaries' assets, properties, or businesses, wherein the calculating step further comprises computing the entries in the table based on a value of an option embedded in the convertible securities by:

determining a series of theoretical convertible security prices using a convertible bond pricing model;

subtracting from the theoretical convertible security prices the greater of (i) a principal amount of the convertible security and (ii) parity, wherein the calculating step further comprises receiving by the computer data inputs to the convertible bond pricing model comprising:

a coupon rate of the convertible securities;

a volatility assumption for the underlying security; and a conversion rate of the convertible securities.

2. The method of claim 1, further comprising, following the occurrence of the fundamental event and conversion by a holder of one of the convertible securities, paying the holder the make-whole premium.

3. The method of claim 1, wherein the convertible securities comprises a put provision.

4. The method of claim 3, further comprising, following the occurrence of the fundamental event and a put by a holder of one of the convertible securities, paying the holder the make-whole premium.

5. The method of claim 1, wherein the make-whole premium is payable in cash.

6. The method of claim 1, wherein the make-whole premium is payable in securities.

7. A computer-implemented method for supporting the issuance of convertible securities that are convertible into a quantity of an underlying security upon conversion by a holder of the convertible securities, the method comprising:

calculating, by an electronic computer comprising a processor and a memory device, prior to issuance of the convertible securities, entries for a table data structure that establish an amount for a make-whole premium to be paid to the holders of the convertible securities in the event of a fundamental change involving the underlying security, wherein the make-whole premium is compensation that is payable to the holders of the convertible securities upon conversion of the convertible securities following occurrence of the fundamental change, wherein the make-whole premium is determinable from the table based on an effective date of the fundamental change and a consideration value involved in the fundamental change;

wherein the fundamental change comprises one of (i) an acquisition, (ii) a merger, (iii) a takeover, (iv) an exchange offer, (v) a liquidation, (vi) a combination, (vii) a reclassification, (viii) a recapitalization, (ix) a consolidation, (x) a transaction in which a common stock of an issuer of the convertible security is exchanged for some consideration, (xi) a change of control occurring upon (a) a change in an ownership of the issuer's voting securities, (b) a change in a composition of the issuer's board of directors, or (c) an acquisition of more than a specified percentage of securities of the issuer, or (xii) sale or other disposition of all or substantially all of the issuer's and its subsidiaries' assets, properties, or businesses wherein the calculating step further comprises computing the entries in the table based on a value of an option embedded in the convertible securities by:

determining a series of theoretical convertible security prices using a convertible bond pricing model;

subtracting from the theoretical convertible security price the parity value, wherein the calculating step further comprises receiving by said computer data inputs to the convertible bond pricing model comprising:
  a coupon rate of the convertible securities;
  a volatility assumption for the underlying security; and
  a conversion rate of the convertible securities.

8. The method of claim 7, further comprising, following the occurrence of the fundamental event and conversion by a holder of one of the convertible securities, paying the holder the make-whole premium.

9. The method of claim 7, wherein the convertible securities comprises a put provision.

10. The method of claim 9, further comprising, following the occurrence of the fundamental event and a put by a holder of one of the convertible securities, paying the holder the make-whole premium.

11. The method of claim 7, wherein the make-whole premium is payable in cash.

12. The method of claim 7, wherein the make-whole premium is payable in securities.

13. An apparatus for supporting the issuance of convertible securities that are convertible into a quantity of an underlying security upon conversion by a holder of the convertible securities, the apparatus comprising:
  an electronic computer system that calculates entries in a table data structure that establish an amount for a make-whole premium to be paid to holders of the convertible securities as compensation upon conversion following occurrence of a fundamental change involving the underlying security, wherein the make-whole premium is determinable from the table entries based on an effective date of the fundamental change and a consideration value involved in the fundamental change,
  wherein the fundamental change comprises one of (i) an acquisition, (ii) a merger, (iii) a takeover, (iv) an exchange offer, (v) a liquidation, (vi)a combination, (vii) a reclassification, (viii) a recapitalization, (ix) a consolidation, (x) a transaction in which a common stock of an issuer of the convertible security is exchanged for some consideration, (xi) a change of control occurring upon (a) a change in an ownership of the issuer's voting securities, (b) a change in a composition of the issuer's board of directors, or (c) an acquisition of more than a specified percentage of securities of the issuer, or (xii) sale or other disposition of all or substantially all of the issuer's and its subsidiaries'assets, properties, or businesses,
  wherein the computer system comprises:
    an electronic processor; and
    a computer memory device in communication with the processor, wherein the computer memory device stores instructions that when executed by the processor cause the processor to calculate the entries for the table based on a value of an option embedded in the convertible securities by:
      determining a series of theoretical convertible security prices using a convertible bond pricing model; and
      subtracting from the theoretical convertible security prices the greater of (i) a principal amount of the convertible security and (ii) parity, and
  wherein the computer system receives data inputs for the convertible bond pricing model comprising:
    a coupon rate of the convertible securities;
    a volatility assumption for the underlying security; and
    a conversion rate of the convertible securities.

14. The apparatus of claim 13, wherein the computer memory device comprises a read only memory.

15. The apparatus of claim 14, wherein the computer system is connected to a data network, wherein the data network comprises a local area network (LAN).

16. The apparatus of claim 14, wherein the computer system is connected to a data network, wherein the data network comprises a wide area network (WAN).

17. An apparatus for supporting the issuance of convertible securities that are convertible into a quantity of an underlying security upon conversion by a holder of the convertible securities, the apparatus comprising:
  an electronic computer system that calculates entries in a table that establish an amount of a make-whole premium to be paid to holders of the convertible securities as compensation upon conversion following occurrence of a fundamental change involving the underlying security, wherein the make-whole premium is determinable from the table entries based on an effective date of the fundamental change and a consideration value involved in the fundamental change,
  wherein the fundamental change comprises one of (i) an acquisition, (ii) a merger, (iii) a takeover, (iv) an exchange offer, (v) a liquidation, (vi)a combination, (vii) a reclassification, (viii) a recapitalization, (ix) a consolidation, (x) a transaction in which a common stock of an issuer of the convertible security is exchanged for some consideration, (xi) a change of control occurring upon (a) a change in an ownership of the issuer's voting securities, (b) a change in a composition of the issuer's board of directors, or (c) an acquisition of more than a specified percentage of securities of the issuer, or (xii) sale or other disposition of all or substantially all of the issuer's and its subsidiaries'assets, properties, or businesses,
  wherein the computer system comprises:
    an electronic processor; and
    a computer memory device in communication with the processor, wherein the computer memory device stores instructions that when executed by the processor cause the processor to calculate the entries for the table based on a value of an option embedded in the convertible securities by:
      determining a series of theoretical convertible security prices using a convertible bond pricing model;
      subtracting from the theoretical convertible security price the parity value, and
  wherein computer system receives data inputs for the convertible bond pricing model comprising:
    a coupon rate of the convertible securities;
    a volatility assumption for the underlying security; and
    a conversion rate of the convertible securities.

18. The apparatus of claim 17, wherein the computer memory device comprises a read only memory.

19. The apparatus of claim 18, wherein the computer system is connected to a remote server computer via a data network, wherein the data network comprises a local area network (LAN) and transmits data between the computer system and the remote server computer.

20. The apparatus of claim 18, wherein the computer system is connected to a remote server computer via a data network, wherein the data network comprises a wide area network (WAN) and transmits data between the computer system and the remote server computer.

* * * * *